(12) United States Patent
Tong (10) Patent No.: US 9,994,395 B2
(45) Date of Patent: Jun. 12, 2018

(54) ROLLER CONVEYING DEVICE

(71) Applicant: Guangdong Oufulong Automatic Shelf Technology Co., Ltd., Zhuhai, Guangdong (CN)

(72) Inventor: Fei Tong, Guangdong (CN)

(73) Assignee: GUANGDONG OUFULONG AUTOMATIC SHELF TECHNOLOGY CO., LTD., Zhuhai (CN)

(*) Notice: Subject to any disclaimer, the term of this patent is extended or adjusted under 35 U.S.C. 154(b) by 0 days. days.

(21) Appl. No.: 15/643,486

(22) Filed: Jul. 7, 2017

(65) Prior Publication Data

US 2017/0305670 A1   Oct. 26, 2017

Related U.S. Application Data

(63) Continuation-in-part of application No. 15/220,450, filed on Jul. 27, 2016.

(30) Foreign Application Priority Data

Dec. 29, 2015 (CN) ..................... 2015 2 1130970 U (51) Int. Cl.
   *B65G 13/11* (2006.01)
   *B65G 21/06* (2006.01)
   *B65G 23/44* (2006.01)
   *B65G 39/12* (2006.01)

(52) U.S. Cl.
   CPC .............. *B65G 13/11* (2013.01); *B65G 23/44* (2013.01); *B65G 39/12* (2013.01)

(58) Field of Classification Search
   CPC ........ B65G 13/11; B65G 39/12; B65G 21/02; B65G 21/06; B65G 21/10; B65G 41/006
   USPC ...................... 198/860.1; 193/35 R
   See application file for complete search history.

(56) References Cited

U.S. PATENT DOCUMENTS

| 2,593,089 | A | * | 4/1952 | Barry | ................ | B65G 13/11 |
| | | | | | | 193/35 R |
| 5,421,451 | A | * | 6/1995 | Easton | ............... | B65G 21/06 |
| | | | | | | 198/860.1 |
| 5,971,137 | A | * | 10/1999 | Grant | ............... | B65G 47/261 |
| | | | | | | 198/780 |
| 6,089,385 | A | * | 7/2000 | Nozawa | ............... | A47F 7/28 |
| | | | | | | 193/35 R |
| 8,276,772 | B2 | * | 10/2012 | Kim | ................... | A47F 1/12 |
| | | | | | | 211/151 |

(Continued)

*Primary Examiner* — James R Bidwell (57) ABSTRACT

The disclosure provides a roller conveying device, comprising: a base, a plurality of electric rollers, a left blanking plate and a right blanking plate. the two ends of the left blanking plate and the right blanking plate are provided with a block respectively; the left and right sides of the block are accommodated in the through grooves of the left blanking plate and the right blanking plate respectively; the left and right sides of the block are provided with a recessed cavity respectively; the two ends of the left blanking plate and the right blanking plate are provided with a baffle plate respectively, and the baffle plates of the left blanking plate and the right blanking plate are respectively accommodated in the recessed cavities on the left and right sides of the block to limit the movement of the block, thereby limiting the movement of the base.

3 Claims, 9 Drawing Sheets

(56) References Cited

U.S. PATENT DOCUMENTS

| | | | | |
|---|---|---|---|---|
| 8,376,154 B2* | 2/2013 | Sun | ............... | A47F 1/125 |
| | | | | 193/35 J |
| 9,220,353 B2* | 12/2015 | Brugmann | ............. | B65G 1/023 |
| 9,266,678 B2* | 2/2016 | Nickell | ................. | B65G 13/11 |
| 2006/0070859 A1* | 4/2006 | Pahlow | ................. | B65G 15/10 |
| | | | | 198/809 |
| 2008/0217143 A1* | 9/2008 | Lawless | ................. | B65G 1/023 |
| | | | | 198/860.1 |
| 2009/0260958 A1* | 10/2009 | Koeda | ................... | B65G 21/06 |
| | | | | 198/860.1 |
| 2014/0251768 A1* | 9/2014 | Miles | .................... | B65G 21/06 |
| | | | | 198/860.1 |
| 2015/0166263 A1* | 6/2015 | Collot | ............... | B65G 21/2072 |
| | | | | 198/860.1 |

* cited by examiner

ROLLER CONVEYING DEVICE

CROSS-REFERENCE TO RELATED APPLICATIONS

The present application is a Continuation-In-Part Application of U.S. patent application Ser. No. 15/220,450 filed on Jul. 27, 2016 which claims the benefit of Chinese Utility Model Application No. 201521130970.X filed on Dec. 29, 2015, the contents of which are hereby incorporated by reference.

TECHNICAL FIELD

The disclosure relates to the technical field of conveying devices, and in particular to a roller conveying device.

BACKGROUND

At present, roller conveying devices are widely applied to equipment to convey goods. A roller conveying device includes a roller fixing base and a plurality of electric rollers; the electric rollers are arranged between two roller fixing bases, mounting shafts at the two ends of the electric roller stretch into mounting holes arranged on the roller fixing bases, that is, the electric roller are fixed by the roller fixing base, the two ends of the roller fixing base are further provided with protective covers for security protection, and the protective cover is fixedly arranged on the end part of the roller fixing base through a bolt; in order to enable the goods on the rollers to be conveyed parallel to the ground surface, the plurality of electric rollers are required to have the same height, that is, the mounting holes in the roller fixing base are required to have the same height; therefore, this type of electrical-roller mounting fixing structure requires high machining precision, and is high in processing cost and complex in assembly.

Thus it can be seen that existing technologies have certain defect.

SUMMARY

In view of this, in order to solve the problem in existing technologies, the disclosure provides a roller conveying device, which has low processing difficulty, and is ingenious in structure and easy in assembly.

The disclosure solves the above problems through the following technical means.

A roller conveying device includes a base, a plurality of electric rollers, a left blanking plate and a right blanking plate.

The base is composed of a base plate and a side plate fixedly arranged on the base plate.

The side plate is composed of a left side plate and a right side plate, which are arranged on the left and right sides of the base plate respectively;

Top parts of the left side plate and the right side plate are provided with open grooves.

Mounting shafts at the two ends of the electric roller are respectively arranged in the open grooves of the left side plate and the right side plate.

Side surfaces of the left blanking plate and the right blanking plate are provided with through grooves, and the left blanking plate and the right blanking plate are symmetric to each other.

The left side plate and the right side plate are accommodated in the through grooves of the left blanking plate and the right blanking plate respectively, and a through groove surface blocks the open grooves of the left side plate and the right side plate.

The two ends of the left blanking plate and the right blanking plate are provided with a block respectively.

The left and right sides of the block are accommodated in the through grooves of the left blanking plate and the right blanking plate respectively.

The left and right sides of the block are provided with a recessed cavity respectively.

The two ends of the left blanking plate and the right blanking plate are provided with a baffle plate respectively, and the baffle plates of the left blanking plate and the right blanking plate are respectively accommodated in the recessed cavities on the left and right sides of the block to limit the movement of the block.

Further, the left and right sides of the bottom part of the base plate are provided with a recess respectively, the left blanking plate and the right blanking plate are provided with a protruding block matched with the recess respectively, and the protruding block is accommodated in the recess.

Further, the base is a base made from material PA.

Compared with existing technologies, the disclosure has benefits as follows.

The mounting shafts at the two ends of the electric roller are arranged in the open grooves of the left side plate and the right side plate respectively; the left side plate and the right side plate are accommodated in the through grooves of the left blanking plate and the right blanking plate respectively; the through groove surface blocks the open grooves of the left side plate and the right side plate so that the mounting shafts at the two ends of the electric roller are located in one hole respectively, that is, equivalent to the mounting hole fixing in existing technologies; the two ends of the left blanking plate and the right blanking plate are provided with a block respectively; the left and right sides of the block are provided with a recessed cavity respectively; the two ends of the left blanking plate and the right blanking plate are provided with a baffle plate respectively, and the baffle plates of the left blanking plate and the right blanking plate are respectively accommodated in the cavities on the left and right sides of the block to limit the movement of the block, thereby limiting the movement of the base. The disclosure has low difficulty in components processing, is ingenious in entire structure and easy in assembly, and fastens the electric rollers firmly.

BRIEF DESCRIPTION OF THE DRAWINGS

To better describe the technical scheme in the embodiment of the disclosure, accompanying drawings needed in the description of the embodiment are simply illustrated below; obviously, accompanying drawings described hereinafter merely illustrate some embodiments of the disclosure; for the ordinary staff in the field, other accompanying drawings may be obtained according to these accompanying drawings without creative work.

DESCRIPTION OF DESIGNATORS IN DRAWINGS 1 represents a base, 2 represents an electric roller, 3 represents a left blanking plate, 4 represents a right blanking plate, 5 represents a base plate, 6 represents a left side plate, 7 represents a right side plate, 8 represents an open groove, 9 represents a mounting shaft, 10 represents a through groove, 11 represents a block, 12 represents a recessed cavity, 13 represents a baffle plate, 14 represents a recess, 15 represents a protruding block, and 16 represents a through groove surface.

DESCRIPTION OF THE EMBODIMENTS

The above purpose, features and advantages of the disclosure will become more clearly understood from the detailed description of the technical scheme of the disclosure below taken in conjunction with accompanying drawings and specific embodiments. Obviously, the embodiments described hereinafter are simply part embodiments of the disclosure, but all the embodiments. All other embodiments obtained by those skilled in the art based on the embodiments in the disclosure without creative work are intended to be included in the scope of protection of the disclosure.

It is to be noted that directional or positional relations indicated by terms such as "top", "bottom", etc. are directional or positional relations shown based on the drawings, merely to conveniently describe the disclosure and simplify the description, but to indicate or imply the designated device or element to be constructed and operated in a specific position or in a specific direction; therefore, the used directional terms cannot be understood as a limit to the disclosure.

Terms "first", "second" and "third" are merely for the purpose of description, but cannot be understood as the indication or implication of relative importance or the implicit indication of the number of the designated technical features; therefore, features defined by "first", "second" and "third" may explicitly or implicitly include one or more such features. In the description of the disclosure, unless otherwise stated, "a group of" means two or more than two.

Embodiment

Figure 1:
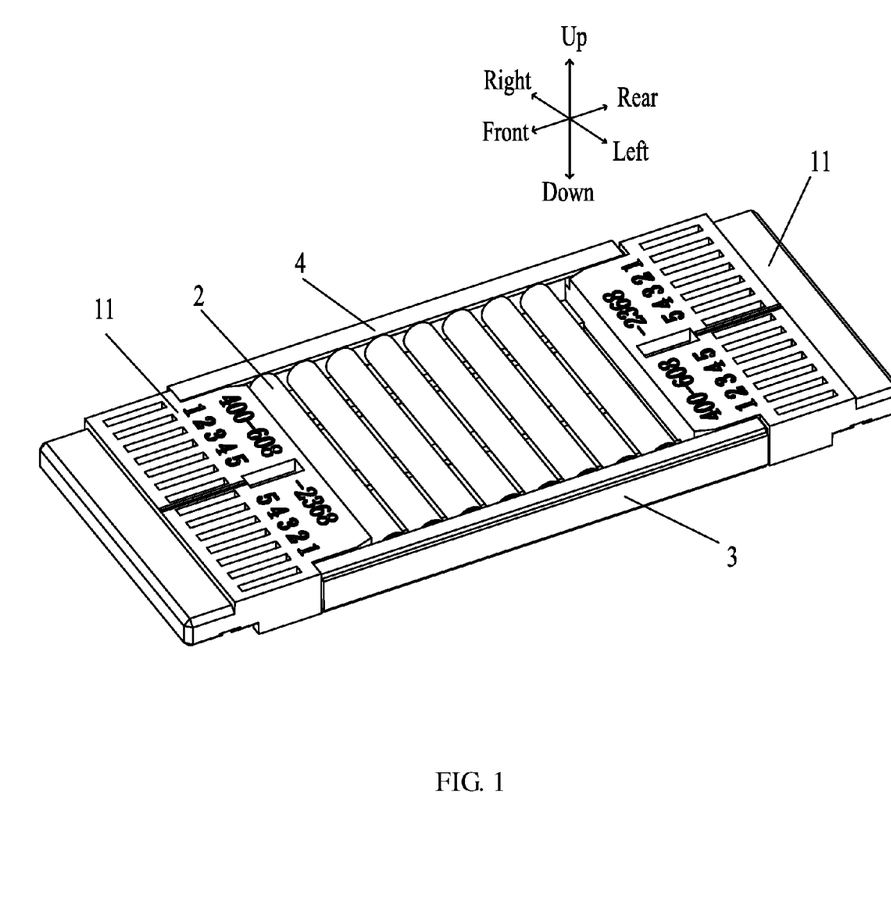
FIG. 1 is an axonometric drawing of the disclosure.
Figure 2:
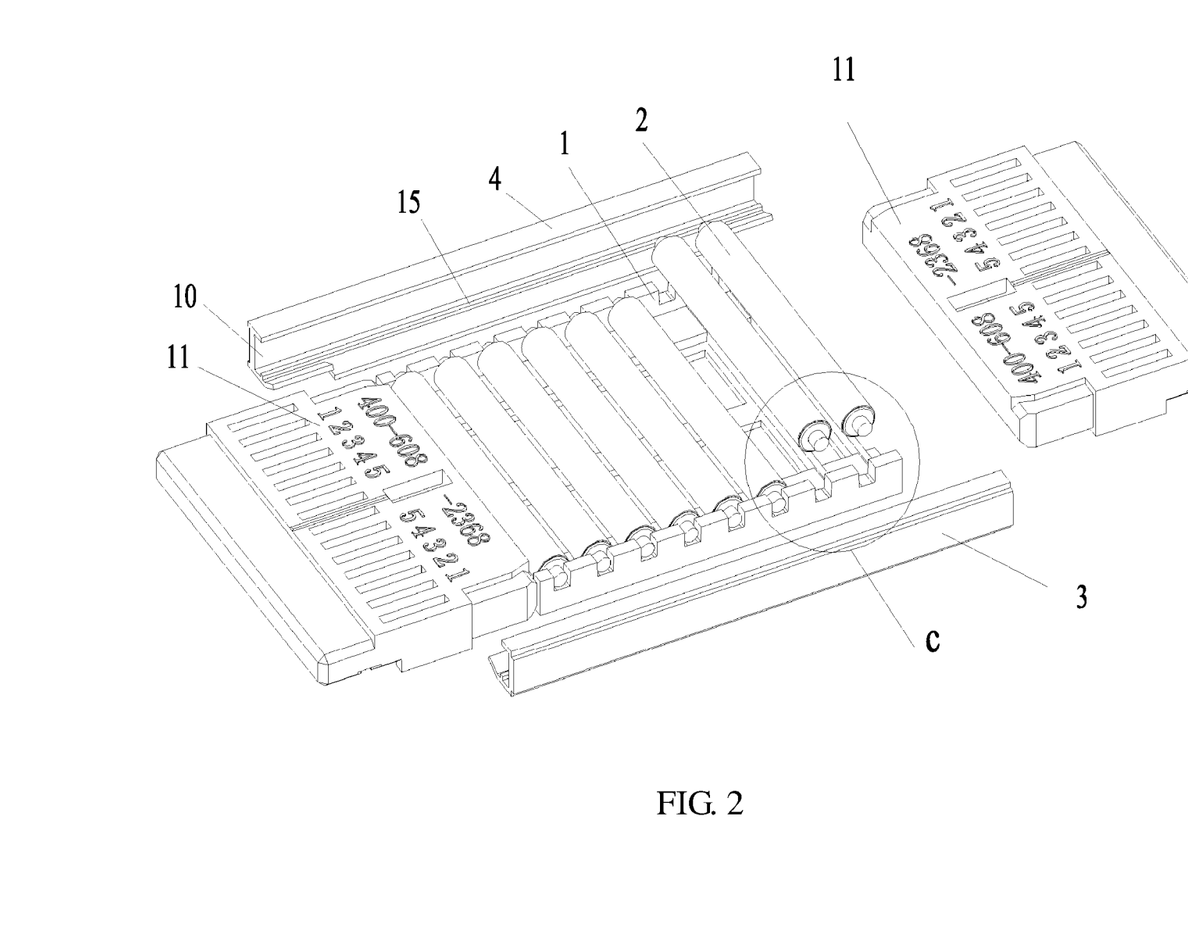
FIG. 2 is an exploded drawing of the disclosure.
Figure 3:
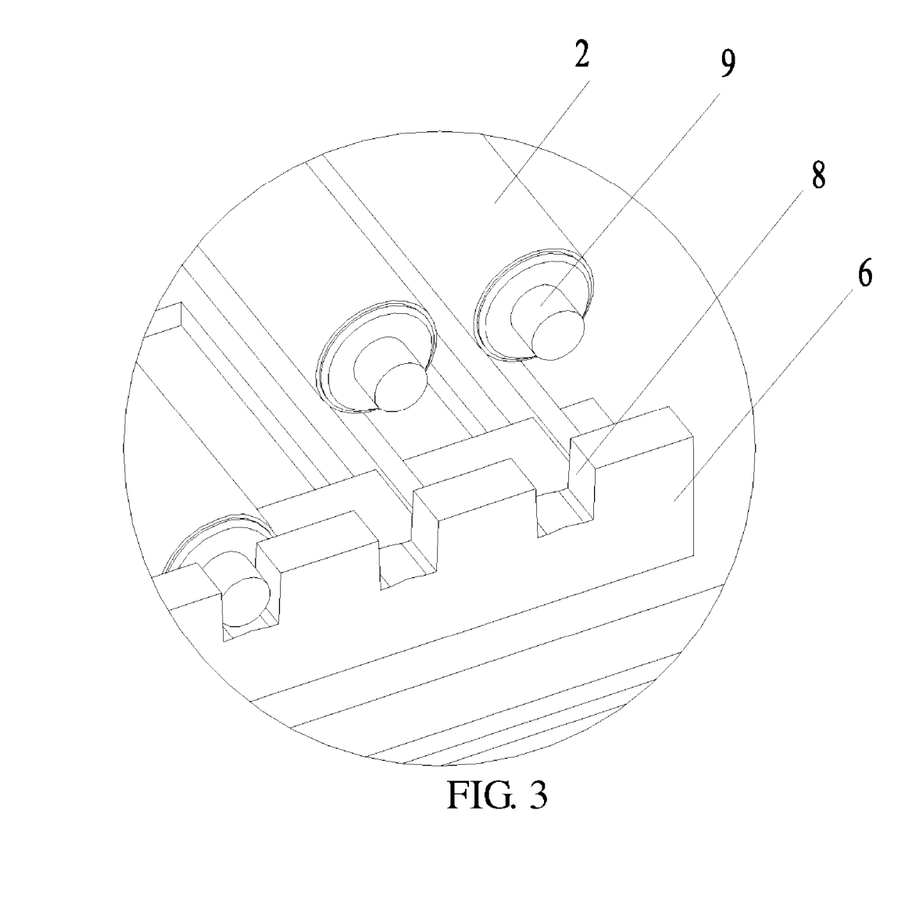
FIG. 3 is a partial enlarged drawing of C of FIG. 2.
Figure 4:
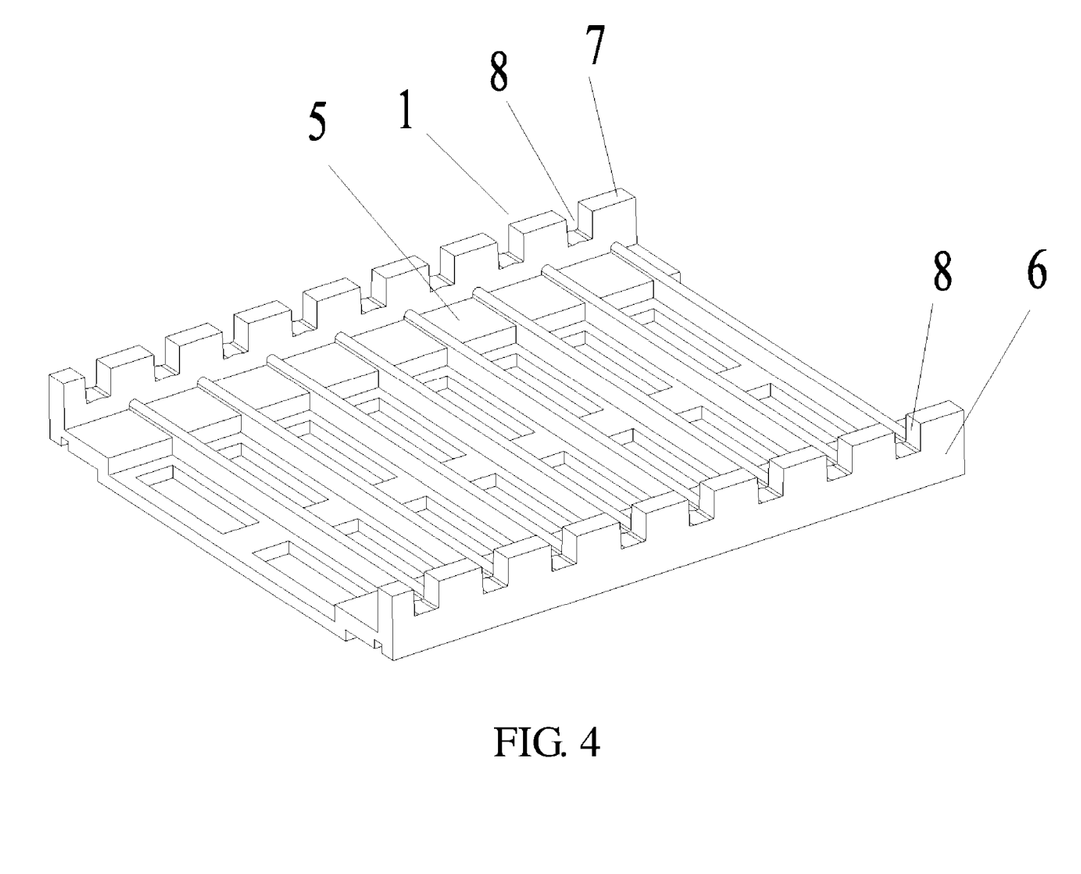
FIG. 4 is an axonometric drawing of a base in the disclosure.
Figure 5:
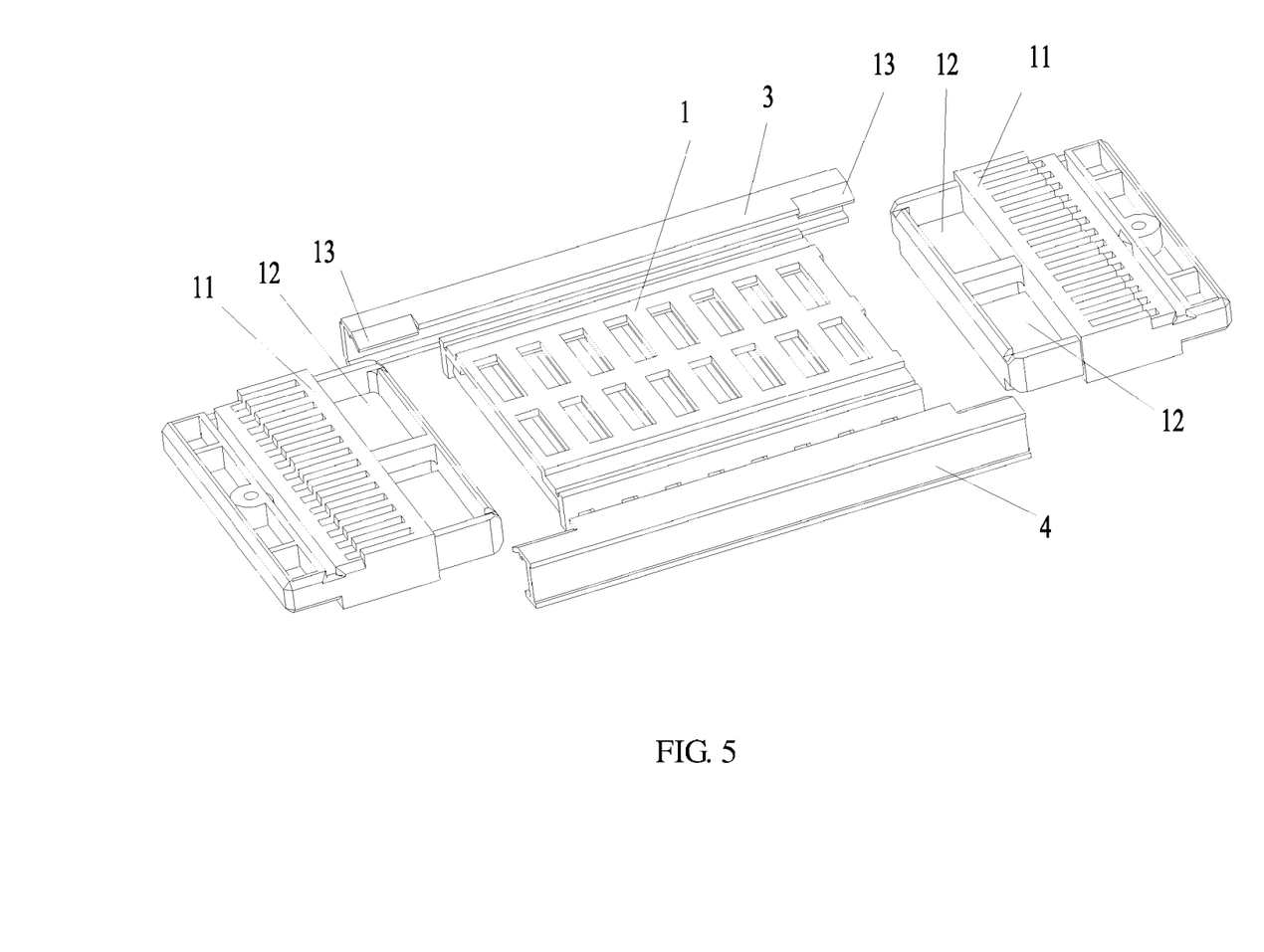
FIG. 5 is an exploded drawing of the disclosure from another angle.
Figure 6:
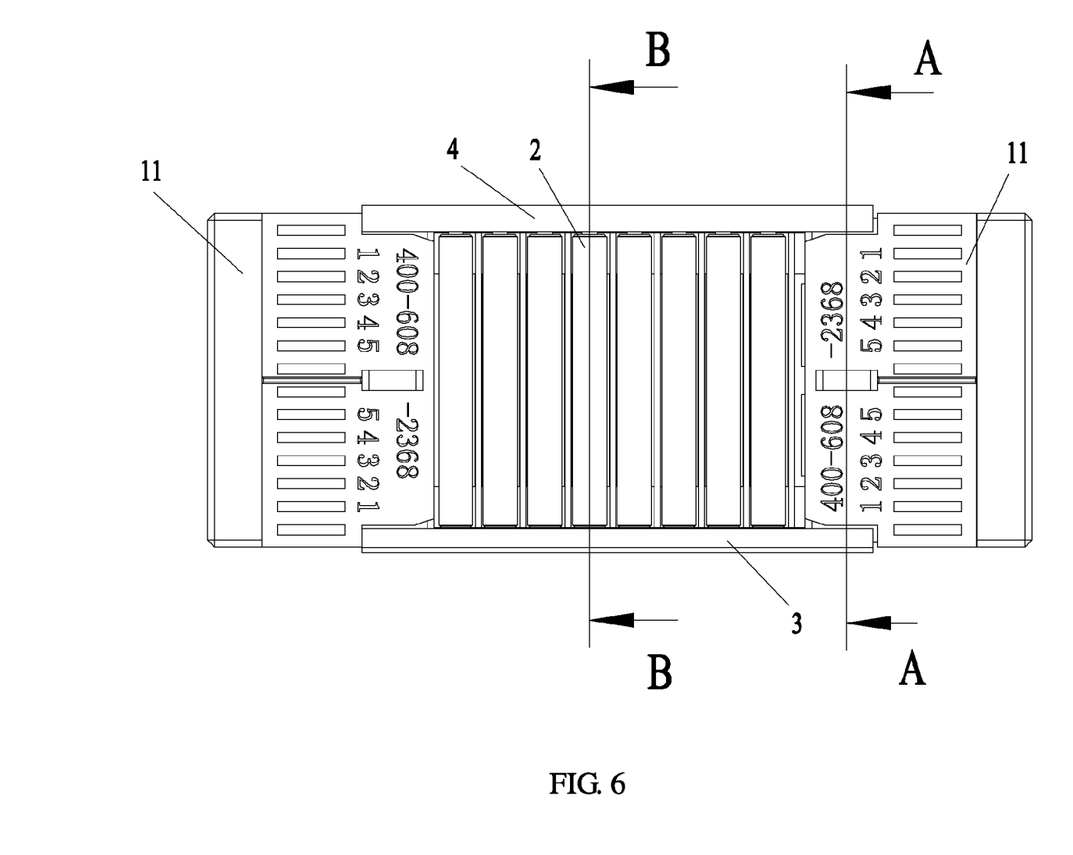
FIG. 6 is a front view of the disclosure.
Figure 7:
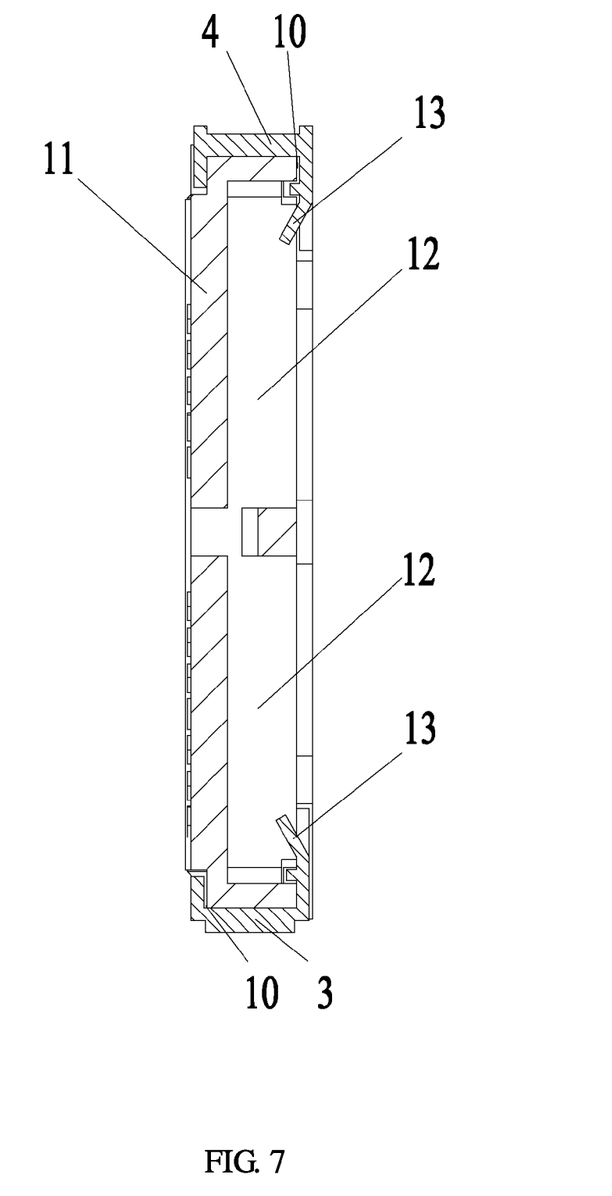
FIG. 7 is an A-A sectional view of FIG. 6.
Figure 8:
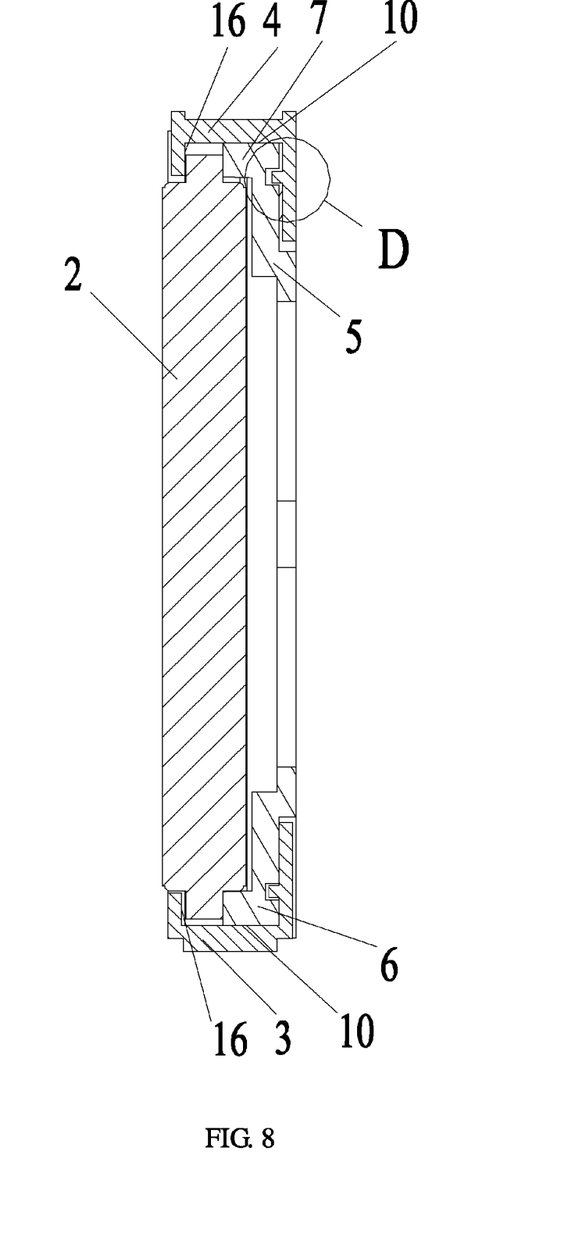
FIG. 8 is a B-B sectional view of FIG. 6.
Figure 9:
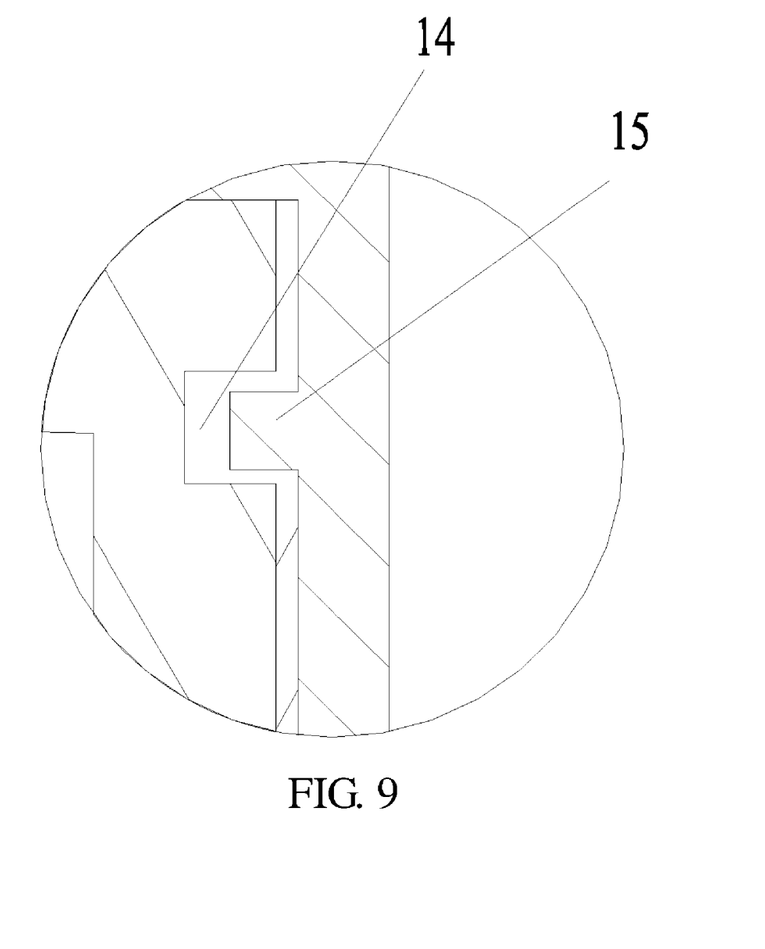
FIG. 9 is a partial enlarged drawing of D of FIG. 8.

As shown in FIG. 1 to FIG. 9, a roller conveying device includes: a base 1, a plurality of electric rollers 2, a left blanking plate 3 and a right blanking plate 4.

The base 1 is composed of a base plate 5 and a side plate fixedly arranged on the base plate 5.

The side plate is composed of a left side plate 6 and a right side plate 7, which are arranged on the left and right sides of the base plate 5 respectively.

Top parts of the left side plate 6 and the right side plate 7 are provided with open grooves 8.

Mounting shafts 9 at the two ends of the electric roller 2 are respectively arranged in the open grooves 8 of the left side plate 6 and the right side plate 7.

Side surfaces of the left blanking plate 3 and the right blanking plate 4 are provided with through grooves 10; the left blanking plate 3 and the right blanking plate 4 are symmetric to each other.

The left side plate 6 and the right side plate 7 are accommodated in the through grooves 10 of the left blanking plate 3 and the right blanking plate 4 respectively; the through grooves 10 of the left blanking plate 3 and the right blanking plate 4 limit the degree of freedom of the left side plate 6 and the right side plate 7 to move up and down, left and right; the left side plate 6, the right side plate 7 and the base 1 can move along the direction of the through groove 10 only; a through groove surface 16 blocks the open grooves 8 of the left side plate 6 and the right side plate 7; the through groove surface 16 and the open groove 8 realize the enclosing of the mounting shaft 9, that is, the radial fixing of the mounting shaft 9.

Two opposite inner side surfaces of the left side plate 6 and the right side plate 7 realize the axial fixing of the mounting shaft 9.

The two ends of the left blanking plate 3 and the right blanking plate 4 are provided with a block 11 respectively.

The left and right sides of the block 11 are accommodated in the through grooves 10 of the left blanking plate 3 and the right blanking plate 4 respectively; the through grooves 10 of the left blanking plate 3 and the right blanking plate 4 limit the degree of freedom of the block 11 to move up and down, left and right; the block 11 can move along the direction of the through groove 10 only.

The left and right sides of the block 11 are provided with a recessed cavity 12 respectively.

The two ends of the left blanking plate 3 and the right blanking plate 4 are provided with a baffle plate 13 respectively, and the baffle plates 13 of the left blanking plate 3 and the right blanking plate 4 are respectively accommodated in the recessed cavities 12 on the left and right sides of the block 11 to limit the movement of the block 11.

The mounting shafts 9 at the two ends of the electric roller 2 are arranged in the open grooves 8 of the left side plate 6 and the right side plate 7 respectively; the left side plate 6 and the right side plate 7 are accommodated in the through grooves 10 of the left blanking plate 3 and the right blanking plate 4 respectively; the through groove surface 16 blocks the open grooves 8 of the left side plate 6 and the right side plate 7 so that the mounting shafts 9 at the two ends of the electric roller 2 are located in one hole respectively, that is, equivalent to the mounting hole fixing in existing technologies; the two ends of the left blanking plate 3 and the right blanking plate 4 are provided with a block 11 respectively; the left and right sides of the block 11 are provided with a recessed cavity 12 respectively; the two ends of the left blanking plate 3 and the right blanking plate 4 are provided with a baffle plate 13 respectively, and the baffle plates 13 of the left blanking plate 3 and the right blanking plate 4 are respectively accommodated in the cavities 12 on the left and right sides of the block 11 to limit the movement of the block 11, thereby limiting the movement of the base 1. The disclosure is ingenious in entire structure and is easy in assembly, and fastens the electric rollers 2 firmly.

As a preferred scheme, the left and right sides of the bottom part of the base plate 5 are provided with a recess 14 respectively, the left blanking plate 3 and the right blanking plate 4 are provided with a protruding block 15 matched with the recess 14 respectively, and the protruding block 15 is accommodated in the recess 14.

As a preferred scheme, the base 1 is made from material PA.

The above embodiments merely illustrate several implementations of the disclosure, with specific and detailed description, however, they cannot be considered as a limit to the scope of this patent. It should be noted that, for the ordinary staff in this art, multiple deformations and improvements may be made without departing from the idea of the disclosure, and these deformations and improvements belong to the scope of protection of the disclosure. Therefore, the protection scope of the disclosure should be based on claims appended herein.

What is claimed is:

1. A roller conveying device, characterized in that: the roller conveying device comprises a base, a plurality of electric rollers, a left blanking plate and a right blanking plate;
the base is composed of a base plate and a side plate fixedly arranged on the base plate;
the side plate is composed of a left side plate and a right side plate, which are arranged on the left and right sides of the base plate respectively;
top parts of the left side plate and the right side plate are provided with open grooves;
mounting shafts at the two ends of the electric roller are respectively arranged in the open grooves of the left side plate and the right side plate;
side surfaces of the left blanking plate and the right blanking plate are provided with through grooves, and the left blanking plate and the right blanking plate are symmetric to each other;
the left side plate and the right side plate are accommodated in the through grooves of the left blanking plate and the right blanking plate respectively, and a through groove surface blocks the open grooves of the left side plate and the right side plate;
the two ends of the left blanking plate and the right blanking plate are provided with a block respectively;
the left and right sides of the block are accommodated in the through grooves of the left blanking plate and the right blanking plate respectively;
the left and right sides of the block are provided with a recessed cavity respectively;
the two ends of the left blanking plate and the right blanking plate are provided with a baffle plate respectively, and the baffle plates of the left blanking plate and the right blanking plate are respectively accommodated in the recessed cavities on the left and right sides of the block to limit the movement of the block.

2. The roller conveying device according to claim 1, characterized in that: the left and right sides of the bottom part of the base plate are provided with a recess respectively, the left blanking plate and the right blanking plate are provided with a protruding block matched with the recess respectively, and the protruding block is accommodated in the recess.

3. The roller conveying device according to claim 1, characterized in that: the base is a base made from material PA.

\* \* \* \* \*